C. S. BISHOP.
PORTABLE SAWING MACHINE.
APPLICATION FILED MAY 1, 1909.

968,114.

Patented Aug. 23, 1910.

Witnesses
Everett Lancaster
H. Conradyk

Inventor
Chester S. Bishop,
By C. A. Harpman,
his Attorney.

UNITED STATES PATENT OFFICE.

CHESTER S. BISHOP, OF SPRINGFIELD, MISSOURI.

PORTABLE SAWING-MACHINE.

968,114.  Specification of Letters Patent.   Patented Aug. 23, 1910.

Application filed May 1, 1909. Serial No. 493,367.

*To all whom it may concern:*

Be it known that I, CHESTER S. BISHOP, a citizen of the United States, residing in Springfield, county of Greene, and State of Missouri, have invented certain new and useful Improvements in Portable Sawing-Machines, of which the following is a full, clear, and exact description.

This invention relates to sawing machines and the principal object of the same is to provide a portable machine that may be readily moved to different locations for the convenience of workmen, so that, in the event of the machine being used in connection with building operations, the rough material may be operated upon at the site of the building.

With the above generally stated object in view the invention contemplates providing a suitable platform mounted upon supporting wheels and equipped with a suitable motor for propelling the same, a rotary saw being mounted in said platform and operated by said motor, the connection between said saw and its source of power being a flexible one so that the saw may be manually reciprocated in a horizontal plane in accordance with the position of the work supported by said platform and which is to be sawed.

As an adjunct to the foregoing prominent features of the invention it is contemplated providing the platform with mitering scales by means of which the work may be set at various angles relative to the saw.

In the practical application of the invention it will be understood, of course, that the essential features thereof are necessarily susceptible of changes in details and structural arrangements, one preferred and simple embodiment of which is shown in the accompanying drawings, wherein:—

Figure 1:
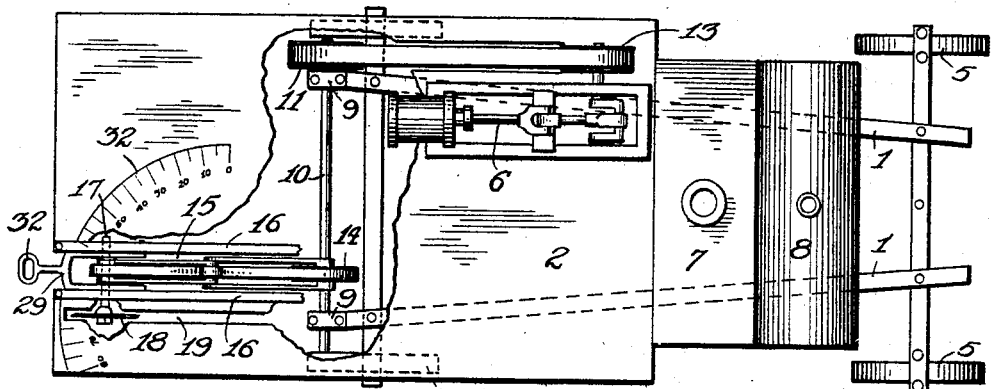
Figure 2:
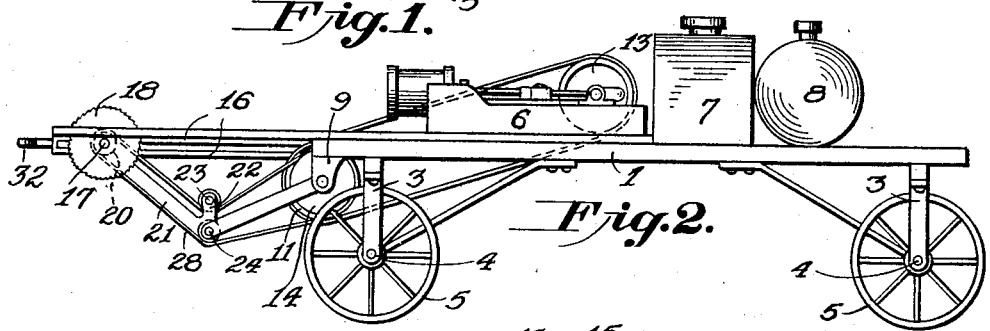
Figure 3:
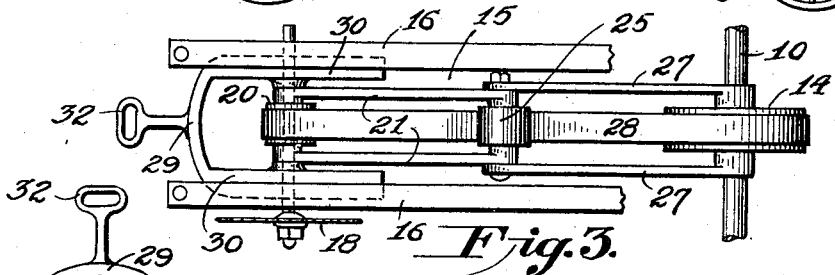
Figure 5:
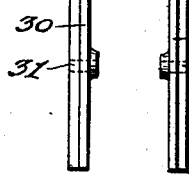
Figure 4:
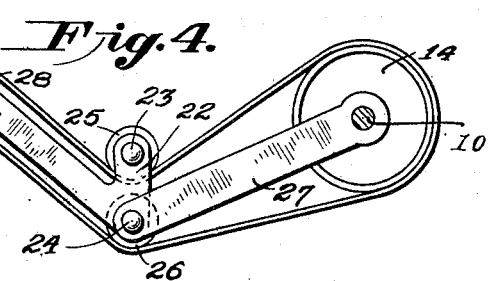

Figure 1 is a top plan view of the improved portable sawing machine, partly broken away. Fig. 2 is a side view thereof. Fig. 3 is an enlarged detail top plan view of the saw operating mechanism. Fig. 4 is a detail view of the means for permitting a horizontal movement of the saw. Fig. 5 is a view of the cross-head by means of which the horizontal movement of the saw is controlled.

Referring to said drawings by numerals, it will be observed that the improved sawing machine is composed of a pair of spaced apart side beams 1 which carry a platform 2 and which are also provided with hanger bearings 3 for the axles 4 of the supporting wheels 5. A motor 6 is mounted on said platform 2, said motor being in communication with a source of water and fuel supply 7—8, respectively.

Hanger bearings 9 are carried by one end portion of said beams 1 in which a transverse power shaft 10 is mounted. A pulley 11 is mounted on said shaft 10, said pulley projecting through the platform 2 and having a belt connection 12 with the drive pulley 13 of the motor 6. Another pulley 14 is mounted on said shaft 10 and projects into a longitudinal slot 15 of the platform 2. Said slot 15 has spaced apart guide strips 16 at each side thereof between which a shaft 17 has its ends slidably mounted. One end of said shaft projects through and beyond its guide strips and has a rotary saw 18 fast thereon, said saw projecting into a slot 19 in the platform 2. A pulley 20 is fast on the shaft 17 within the slot 15. A pair of link arms 21 have one end pivotally connected to said shaft 17, said arms extending on each side of said pulley 20 and have an angular end portion 22. The angular ends 22 of said arms are connected by an upper shaft 23 and a lower shaft 24, each shaft being equipped with an idler pulley 25 and 26 respectively. A pair of link arms 27 have one end pivotally connected to the shaft 24, the other end of said arms being pivotally connected to the shaft 10. A belt 28 connects pulleys 14—20, the flights of said belt passing under the idler pulleys 25—26.

A crosshead 29 has its spaced apart arms 30 equipped with bearings 31 through which the shaft 17 projects, said crosshead being also provided with a handle 32, by means of which said shaft 17 with its pulley and saw may be moved horizontally in the guide strips 16.

As will be understood from the foregoing, the shaft 10 is driven by the motor and through the pulleys 14—20 and belt connection 28, shaft 17 is operated to rotate the saw 18. In operation the work to be sawed is placed upon the platform 2 in proximity to the saw 18, the handle of the crosshead is grasped by the operator, and by means of the same the saw is pushed into contact with the work. As will be obvious, the crosshead provides means whereby the cut of the saw may be readily manually controlled, and the link connection between the saw shaft 17 and the power shaft 10 provides simple means whereby the tension of the belt is increased as the saw moves toward the power shaft.

As is shown in Fig. 1, the platform 2 is provided with graduated arcs 32 by means of which work being operated upon may be set at various angles relative to the saw, so that the cut of the saw may be at a desired angle.

What I claim as my invention is:—

A portable saw comprising a platform, a power shaft, guideways mounted on said platform, a saw shaft slidably mounted in said guideways, a pair of parallel link arms mounted upon said saw shaft, a pulley mounted between said arms, upon said shaft, the inner ends of said arms having upstanding ears, an idler pulley rotatably mounted between said ears, a second pair of link arms pivotally connected to the inner ends of the first mentioned arms, a second idler pulley rotatably mounted between the first mentioned arms and below the first mentioned idler pulley, the other ends of the second mentioned pair of link arms being pivotally mounted to the power shaft, a pulley mounted on the power shaft, between said second link arms, and a belt connecting the pulley on the saw-shaft to the pulley on the power shaft, the upper flight of said belt passing under the first mentioned idler pulley, and the lower flight passing under the second mentioned idler pulley.

In testimony hereof I hereunto affix my signature in presence of two witnesses.

CHESTER S. BISHOP.

Witnesses:
A. L. WEASLING,
JOHN BISHOP.